June 22, 1954   B. A. MACKEY   2,681,673
DRILL BIT
Filed Oct. 11, 1952
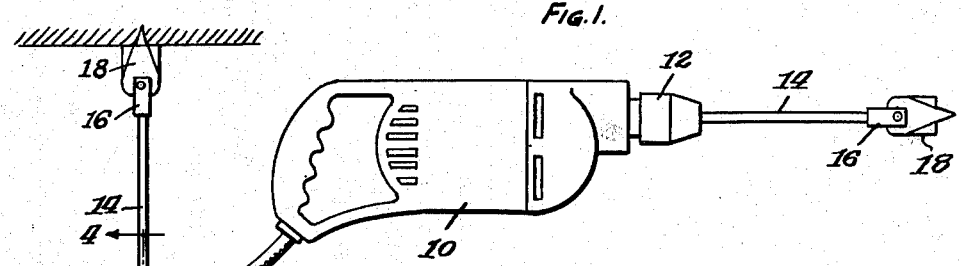
Fig. 1.
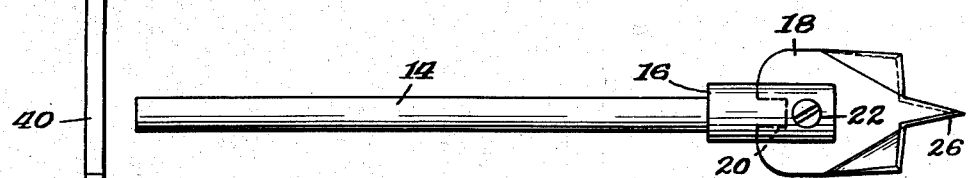
Fig. 3.
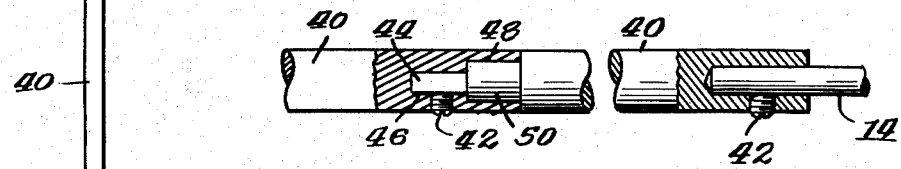
Fig. 4.
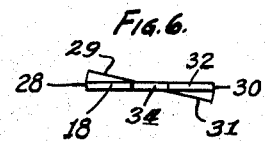
Fig. 6.
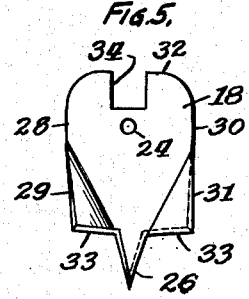
Fig. 5.
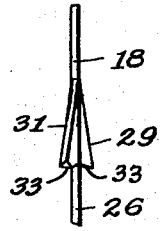
Fig. 8.
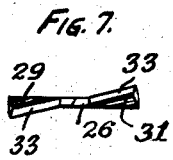
Fig. 7.
Fig. 2.
INVENTOR.
BRUCE A. MACKEY.
BY
Harry H. Hitzman
ATTORNEY.

Patented June 22, 1954

2,681,673

UNITED STATES PATENT OFFICE 2,681,673

DRILL BIT

Bruce A. Mackey, Libertyville, Ill.

Application October 11, 1952, Serial No. 314,298

3 Claims. (Cl. 145—116)

My invention relates to improvements in drill bit construction.

My invention relates more particularly to drill bits of the type used for boring large holes in wood, plastics, aluminum or other generally similar materials and contemplates the provision of a drill shank having a bit blade holder capable of operatively receiving any one of a plurality of different size bit blades which are easily and quickly attached or removed.

My invention further contemplates the provision of extensions for the shank so that holes in ceilings or other places comparatively remote can easily be made by the employment of one or more of the extensions depending upon the distance from the portable electric motor to the location of the proposed openings.

Other features of the invention and the improved construction disclosed include the provision of a drill bit or blade having a thin curved cutting edge which gives a positive lead rake cutting edge. This provides quicker and easier boring of holes than can be obtained with straight edge blades of the type at present on the market.

Other objects and advantages will be more apparent from the following description wherein reference is made to the accompanying drawing upon which:

Fig. 1 is a side elevational view of a portable electric drill motor having a chuck in which the improved bit holder shank and bit of my improved invention is shown;

Fig. 2 is a side elevational view showing the manner in which the assembly is employed for boring holes in ceilings or other inaccessible places, the bit holder shank being connected to the chuck of the motor by a plurality of shank extensions;

Fig. 3 is a side elevational view of the bit holder shank and bit;

Fig. 4 is a fragmentary cross sectional view through the bit holder shank and one of the shank extensions taken generally on the line 4—4 of Fig. 2;

Fig. 5 is a side elevational view of one of the bit blades;

Fig. 6 is a plan view thereof;

Fig. 7 is a bottom view thereof; and

Fig. 8 is a side view of the same.

In the embodiment of the invention which I have chosen to illustrate and describe the same in Fig. 1, I have shown a portable electric drill motor 10 of the usual type having a tool receiving chuck 12 extending forward from the same.

I provide a bit holder shank 14 capable of being securely fastened in the chuck in the usual manner at one end. The other end of the bit holder shank has an enlarged elongated shoulder 16 which is a holder for a drill bit or blade 18. The holder has a slot 20 extending inwardly from the end of the same and is further provided with a set screw 22 screw-threadedly mounted therein and adapted to engage the opening 24 in the bit blade 18 to securely fasten the blade to the end of the holder 16.

The bit blade 18 is preferably furnished in a plurality of sizes for drilling holes of a plurality of sizes. For example, a set may consist of ½", ⅝", ¾", ⅞" and 1" bit blades so that holes of these sizes may be drilled with the set provided.

Each of the bit blades 18 is generally rectangular in shape as shown having a leading point 26 at its forward end, parallel side walls 28 and 30 and a back wall 32 having a square slot 34 therein. Each blade has a portion of the side walls 28 and 30 bent from the plane of the body in the direction of rotation. The lower edge 33 of each of the bent portions is sharpened to provide cutting edges and the edges of the side wall portions 29 and 31 are cleared by sharpening the edges at a slight angle provide a rake cutting angle so that shavings will be fed inwardly from the edge of the hole being bored and a much cleaner and smoother bore is obtained. In addition, by the use of the angled forward cutting edges 33 much more rapid progress is made and holes are much more quickly bored and will be cleaner and smoother on their interior walls when finished. By presenting the angled edge, a shearing action is effected, as contrasted with a scraping action where the cutting action is in the plane of the blade.

When it is desired to bore holes in inaccessible places such as in the ceiling or in places that cannot be reached with the ordinary bit holder shank 14, I employ a plurality of shank extensions 40. One end of the extension 40 may be fastened in the chuck 12 of the portable motor 10 and the other end fastened by means of a set screw 42 to a flattened shoulder 44 on the opposite end of an adjacent extension 40. The shoulder is adapted to fit into an opening 46 in the end of the extension 40 there also being a bore 48 to receive a round reduced shoulder 50 on the end of an adjacent extension 40.

With this construction it can be seen that within reason boring of holes may be done a considerable distance from the operator by the use of the extension shanks which I have provided. Due to the fact that the bit blade is operated at a comparatively high rate of speed and has the angled cutting edge features which I have described, it is possible to effectively bore holes even at a distance by the use of a plurality of shank extensions.

By the use of individual blades which are easily attached or removed from the bit holder it can be seen that when a blade becomes dull or is broken it can be easily removed and replaced. Further, by reason of making the bits or blades detachable from the bit holder when breakage does occur it is considerably less expensive than when it occurs in the use of drill bits that are an integral part of the bit holders.

I contemplate that changes and modifications may be made in the exact details shown and I do not wish to be limited in any particular; rather what I desire to secure and protect by Letters Patent of the United States is:

1. A flat drill blade generally rectangular in shape, having front cutting edges, a back edge and side edges, a centrally located tapered lead point extending forward from the front edges of the same, means at its back edge for attachment to a holder, the front cutting edges and a portion of each of said side edges being bent from the plane of the body of the blade in the direction of rotation, each of said front cutting edges being in a continuous line from the base of said lead point to the side edges of said blade.

2. A flat drill blade generally rectangular in shape, having front cutting edges, a back edge and side edges, a centrally located tapered lead point extending forward from the front edges of the same, means at its back edge for attachment to a holder, the front cutting edges and a portion of each of said side edges being bent from the plane of the body of the blade in the direction of rotation, each of said front cutting edges being in a continuous line from the base of said lead point to the side edges of said blade, said portions of said side edges of the blade being cleared to provide side cutting edges.

3. A flat drill blade generally rectangular in shape, having front cutting edges, a back edge and side edges, a centrally located tapered lead point extending forward from the front edges of the same, means at its back edge for attachment to a holder, the front cutting edges and a portion of each of said side edges being bent from the plane of the body of the blade in the direction of rotation, each of said front cutting edges being in a continuous line from the base of said lead point to the side edges of said blade, said front cutting edges being angularly disposed forward from the plane of the body of said blade to effect a shearing action during a boring operation.

References Cited in the file of this patent

UNITED STATES PATENTS

| Number | Name | Date |
| --- | --- | --- |
| 124,089 | Shepardson | Feb. 27, 1872 |
| 238,002 | Ransom | Feb. 22, 1881 |
| 315,079 | Shotts | Apr. 7, 1885 |
| 1,056,610 | Watkins | Mar. 18, 1913 |
| 2,291,729 | Koett | Aug. 4, 1942 |
| 2,543,206 | Smith | Feb. 27, 1951 |

FOREIGN PATENTS

| Number | Country | Date |
| --- | --- | --- |
| 814,939 | Germany | Aug. 2, 1951 |